United States Patent
Wang et al.

(10) Patent No.: US 6,601,047 B2
(45) Date of Patent: *Jul. 29, 2003

(54) IMAGE-BASED DIGITAL EVIDENCE SYSTEM AND ASSOCIATED METHOD

(75) Inventors: Jinsheng Wang, Sunnyvale, CA (US); Joe Zheng, Cupertino, CA (US)

(73) Assignee: Inbit Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/521,864

(22) Filed: Mar. 8, 2000

(65) Prior Publication Data

US 2002/0082929 A1 Jun. 27, 2002

(51) Int. Cl.[7] .............................................. G06F 17/60
(52) U.S. Cl. ............................ 705/75; 705/26; 707/217
(58) Field of Search ............................. 705/26, 75, 70, 705/76, 64; 707/217, 219

(56) References Cited

U.S. PATENT DOCUMENTS

| 5,170,466 | A | * | 12/1992 | Rogan et al. ............... 707/530 |
| 6,141,653 | A | * | 10/2000 | Conklin et al. ............... 705/26 |
| 6,272,484 | B1 | * | 8/2001 | Martin et al. .................. 707/1 |
| 6,381,344 | B1 | * | 4/2002 | Smithies et al. ............ 382/115 |
| 6,397,194 | B1 | * | 5/2002 | Houvener et al. ............ 705/16 |

FOREIGN PATENT DOCUMENTS

JP          04310180 A    * 11/1992   ........... G06F/15/30

* cited by examiner

Primary Examiner—John W. Hayes
Assistant Examiner—M. Huseman
(74) Attorney, Agent, or Firm—Joe Zheng

(57) ABSTRACT

A digital evidence system is disclosed. According to one embodiment, the digital evidence system records pertinent screen activities such as data entry into an electronic form, verification of a data transfer and a purchase order by capturing images of displayed web pages requiring interactions from the user. The captured images are transmitted back to the business and can be retrieved according to a query about any interaction so that the online business could determine what has happened on the user side when a transaction was engaged with the online business.

42 Claims, 8 Drawing Sheets

Fig. 3B

IMAGE-BASED DIGITAL EVIDENCE SYSTEM AND ASSOCIATED METHOD

BACKGROUND OF THE INVENTION

1. Field of the Invention

The present invention is related to the area of electronic commerce over the Internet and more particularly related to an electronic method and system for tracking screen activities conducted by a user when the user enters transactions with an online business over the Internet. The screen activities are recorded in images as digital evidence that may be retrieved for verification of the transactions when a need arises.

2. Description of the Related Art

The Internet is a data communication network of interconnected computers and computer networks around the world and is rapidly evolving to the point where it combines elements of telecommunications, computing, broadcasting, publishing, commerce, and information services into a revolutionary new business infrastructure. The economy on the Internet is growing in every aspect of life, a wide range of businesses including stock trading, commodities, products, and services ordering are all via the Internet. However, the mushrooming Internet-based electronic commerce (e-commerce) offers opportunities for cyber crimes including credit card frauds, virus attacks, and irrational disputes, which could cost online businesses millions of dollars or more each year.

Many online businesses, such as www.amazon.com, require a buyer to submit electronically personalized information before any transactions take place. The personalized information including the buyer's address and payment information (i.e. a credit card number) is provided to a merchant as to where to ship and how to charge for purchased items. The merchant however has no actual means to verify that the personalized information submitted is authenticated. For example, the credit card number could be a stolen one or the entire transaction is fraudulent. In other cases, a buyer may dispute that a purchased item that has been delivered from the merchant is not what the buyer originally selected in the transaction. Without any evidence how the buyer entered the order, the merchant often has to admit that a mistake was made on the merchant side by taking the item back and bearing all associated costs. As a result, the online transaction overhead for the merchant goes higher and the Internet economy could be potentially hampered.

There is, therefore, a great need for a generic solution that provides a merchant with an effective means to study how a transaction is engaged on the buyer's side so that necessary steps could be taken to fairly resolve any disputes or overcome any fraudulent transactions to minimize the online transaction overhead.

SUMMARY OF THE INVENTION

The present invention has been made in consideration of the above described problems and needs and has particular applications to electronic commerce over the Internet. One of the key features of the present invention is to provide a digital evidence system that can support an online business to make a justified decision or take necessary measures whenever there is a need. The digital evidence system records pertinent screen activities such as data entry into an electronic form, verification of a data transfer and a purchase order by capturing images of displayed web pages requiring interactions from the user. The captured images are transmitted back to the business and can be retrieved according to a query about any interaction by the user so that the online business could determine what has happened on the user side when a transaction was engaged with the online business.

According to one aspect of the present invention, a screen capturing module is activated to capture an image or images of displays whenever a user completes an interaction. The interaction may include data entry, verification, and viewing proof of a document. Specifically, an image of the display including the interaction by the user is captured and subsequently transmitted to the server. On the server side, a screen management system employing a digital evidence module configured to cause images of the displays to be captured manages the images and associates the images with a respective account designated to the user or a transaction identification so that it makes possible to later examine the images when there is a query about the user or the transaction.

The present invention can be implemented in numerous forms. Different implementations of the present invention yield one or more of the following advantages. One advantage of the invention is that an effective digital system is provided to online businesses to track screen activities conducted by users who engage in various transactions with the businesses so that the businesses can take necessary steps or make justified decisions when disputes or frauds arise. Another advantage of the invention is to activate the screen capturing process automatically when a user authorizes to release the user-provided data. The screen capturing process can be performed explicitly or implicitly depending on a particular implementation. Still another advantage of the present invention is the management of the screen images that need to be retrieved only when there is a need.

Accordingly one of the objects of the present inventions is to provide a digital evidence system that can be used effectively to support the online business of many kinds.

Objects and advantage together with the foregoing are attained in the exercise of the invention in the following description and resulting in the embodiments illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 3B illustrates another exemplary web page requiring a user to enter personal information to be released to a server;

DETAILED DESCRIPTION OF THE PREFERRED EMBODIMENTS

According to one aspect of the present invention, a method and system for tracking screen activities performed by a user on a client device communicating over a data network with a server device are disclosed. Such client device may include, but not be limited to, a personal computer, a palm-sized device and a wireless mobile device, all including a display screen and is capable of two-way communication. The data network can be the Internet and the server device may be any computing device operated by a provider that may include, but not be limited to, a retailer, a merchant, an online business, a service provider or a brokerage firm. With the employment of the present invention, the provider can be supported with a digital evidence system that records anything entered by the user and hence make justified decisions with respect to any possible disputes or frauds.

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description is presented largely in terms of procedures, logic blocks, processing, and other symbolic representations that directly or indirectly resemble the operations of data processing devices coupled to networks. These process descriptions and representations are the means used by those experienced or skilled in the art to most effectively convey the substance of their work to others skilled in the art. The method along with the system to be described in detail below is a self-consistent sequence of processes leading to one or more desired results. It proves convenient at times, principally for reasons of common usage, to refer to data as messages, requests, values, elements, symbols, terms, numbers, or the like. It should be borne in mind that all of these similar terms are to be associated with the appropriate physical quantities and are merely convenient labels applied to these quantities.

Figure 1:
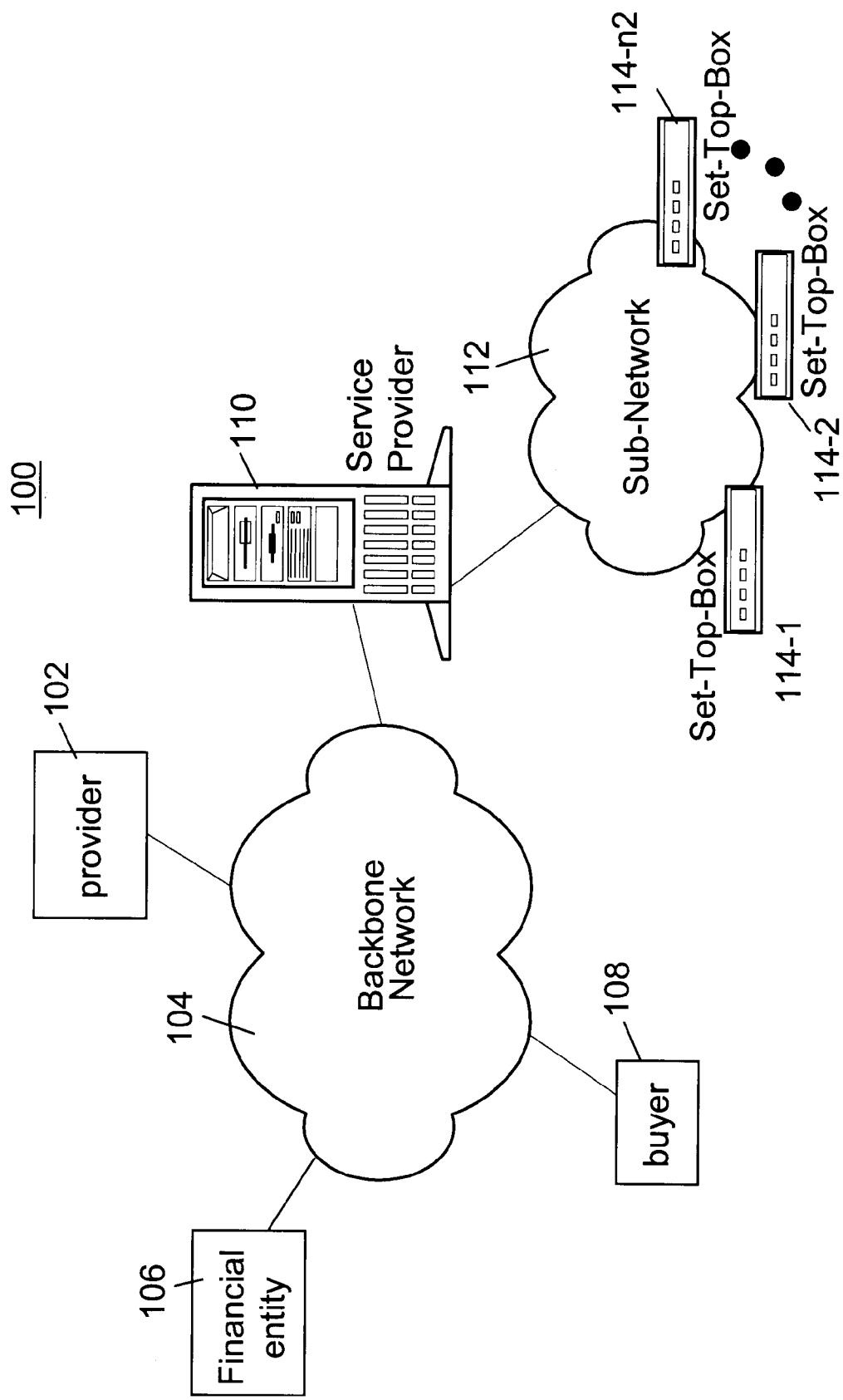
FIG. 1 shows a system configuration in which the present invention may be practiced.

Referring now to the drawings, in which like numerals refer to like parts throughout the several views. FIG. 1 shows a system configuration 100 in which the present invention may be practiced. As used herein, a service, a product provider, or simply a provider represents one of numerous businesses, entities, merchants or retailers that offer various products, applications and services online. Examples of such a provider may include www.amazon.com that offers items from books to consumer electronics, www.ameritrade.com that offers services to allow investors to trade stocks online, and www.evc-aips.com that offers home study services for traffic education.

As shown in the figure a provider 102, through a server computer, is coupled to a data network 104 that may be the Internet or a network of private and/or public networks. To facilitate online transactions between the provider and a user (e.g. a consumer), a third party entity 106, also through a server computer, is coupled to network 104. Third party entity 106 may represent a financial or authorized institution, such as a bank, a credit card authority or an agent, that provides a mechanism for the provider to verify various information submitted by the buyer, to collect charges for items purchased by the user or to electronically proof anything required by the provider for the user.

As used herein, a transaction means an electronic agreement mutually agreed between two entities. For example, a transaction occurs when a provider accepts an order of certain items from a buyer. Likewise a transaction is deemed to occur when pertinent data/information entered/provided by one side is released to the other side. In general a transaction means a sequence of information exchange and related work (such as database updating) that is treated as a unit for the purposes of satisfying a request and for ensuring database integrity. For a transaction to be completed and database changes to occur, a transaction has to be completed in its entirety. One of the common transactions over the Internet is a catalog merchandise order by a customer. When the order is received on the server side, the order transaction involves checking an inventory database, confirming that the item is available, placing the order, and confirming that the order has been placed and the expected time of shipment. If the order is deemed as a single transaction, then all of the steps must be completed and validated before the transaction is successful and the database is actually changed to reflect the new order.

To follow up with the above explanation, services provided online by an entity may include, but not be limited to, stock trading, various education programs, various registrations, electronic tax filing, voting, online gambling and testing, and typically involve data entry or pertinent information to be supplied by a user. For example, in stock trading, a user must enter a stock symbol, a number of shares and sometimes a share price when a trading web page is displayed. Further, it is defined without the loss of generality that an interaction involves activities performed by a user with respect to a displayed page. In the above example, the stock information entered to the trading web page by the user is deemed as an interaction when the trading web page is completed. One of the key features in the present invention is to record the interaction as a digital evidence so that the interaction can be retrieved later on when there is a need to review it.

For illustration purpose, a user 108 communicates with provider 102 through a computing device, referred to as a client device, that may include, but not be limited to, a personal computer, a palm-size computing device, a wireless mobile device and a personal data assistant (PDA), all having a display screen and capable of two-way data communications with data network 104 for ordering electronically products or services from an online business, receiving a confirmation, or making payment thereafter.

To facilitate the description of the present invention, it is defined herein a display screen or a screen is the physical display apparatus in a device, such as a 15 inch CRT or LCD monitor commonly seen with a personal computer. A screen display, a displayed web page, a displayed window or simply a display is an image presented on the display screen. For example, a file that constitutes a display may be an HTML file, wherein HTML stands for HyperText Markup Language, an image thereof appears on a display screen when the file is read or executed by a browser.

For completeness, a service provider 110, also through a respective server computer, is coupled between network 104 and sub-network 112. Typically, sub-network 112 that may be part of network 104 or a local area network (LAN) belonging to a community serves its own community comprising a number of set-top boxes 114, each representing an access to the service provider from a user or a consumer. In general, each of set-top boxes 114 may be a personal computer, a palm-size computing device, a mobile device or a cable control box facilitating an Internet server via a cable. Via service provider 110 that may include an Internet service provider, a wireless carrier, a cable service provider, or any data service provider, each of set-top boxes 114 can communicate with provider 102 for ordering electronically a product or a certain type of services from provider 102.

Figure 2A:
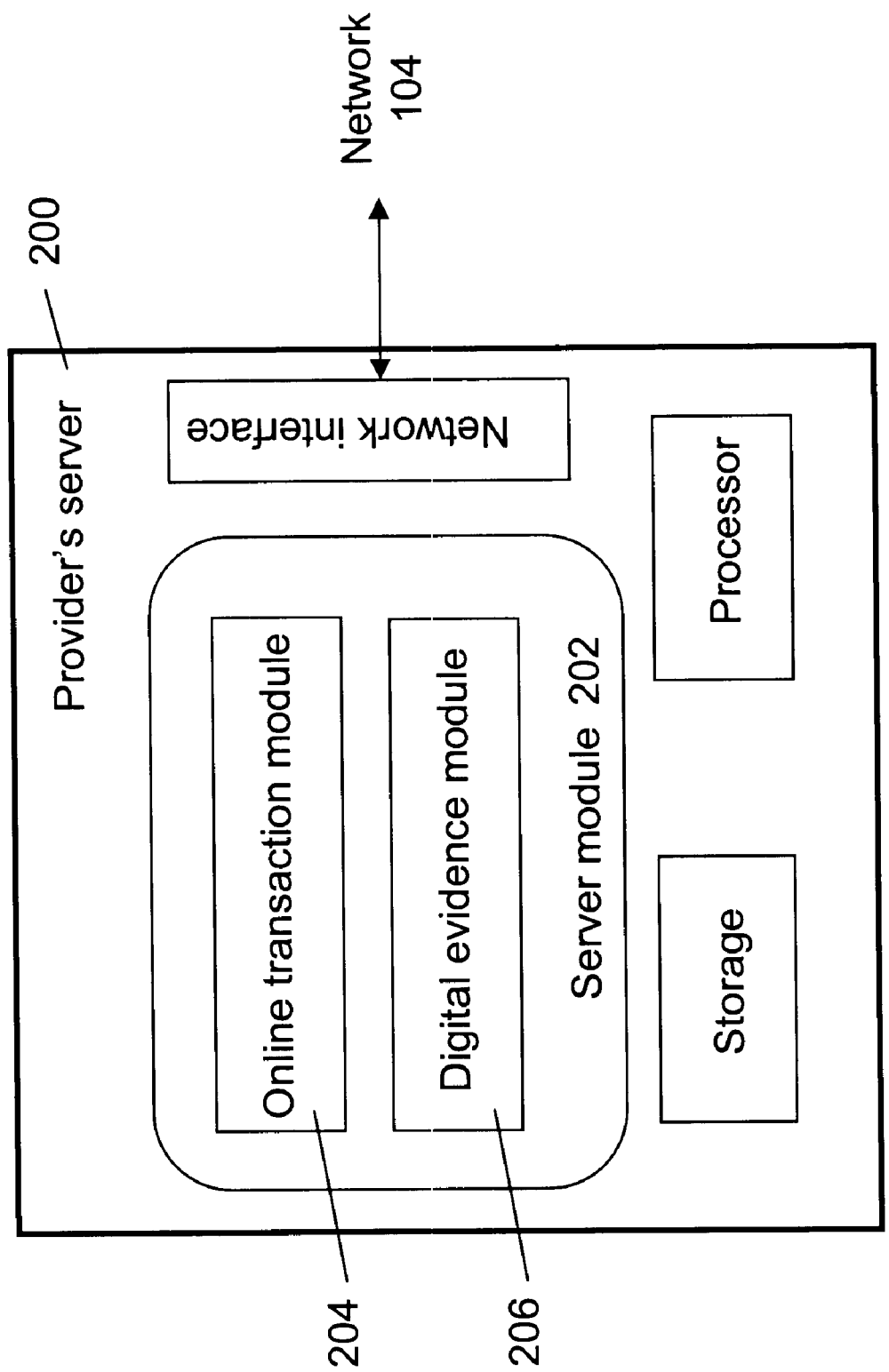
FIG. 2A shows a functional diagram of a provider's server according to one embodiment of the present invention.

Referring now to FIG. 2A, there is shown a functional diagram of a provider's server 200 according to one embodiment of the present invention. Server device 200 may be a personal computer or a workstation used by provider 102 of FIG. 1 to offer products for sales or services online and typically loaded with a server module 202 that may be configured to include an online transaction module 204 and a digital evidence module 206. Online transaction module 204 may be any one of the commercially available or customized applications that facilitate transactions with a client device over a network. One exemplary online transaction module 204 may be the one used at www.officemax-.com that permits a user to select and make an order of an item for sale.

Figure 3A:
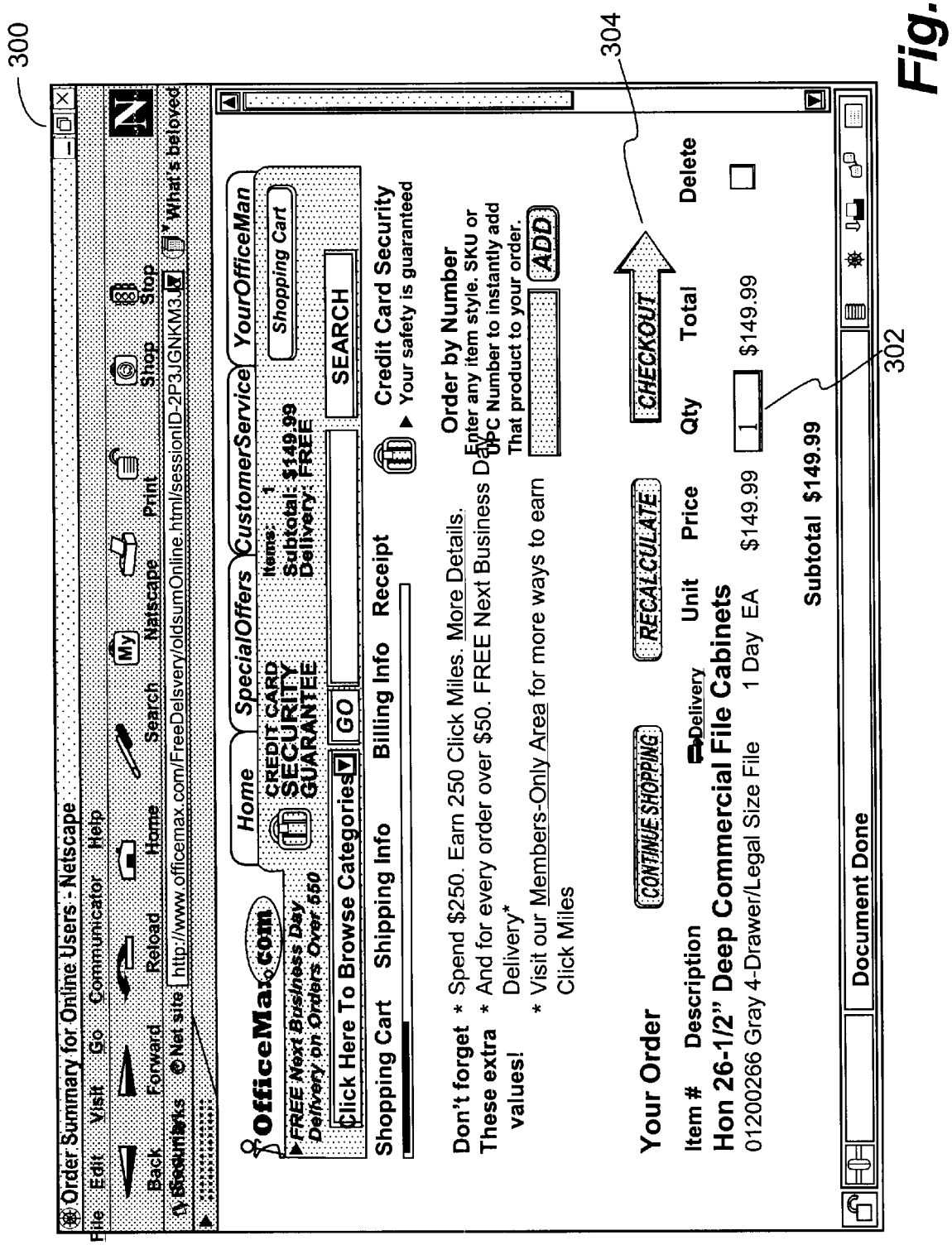
FIG. 3A illustrates an exemplary web page requiring a user to enter quantity information to be released to a server.
Figure 3B:
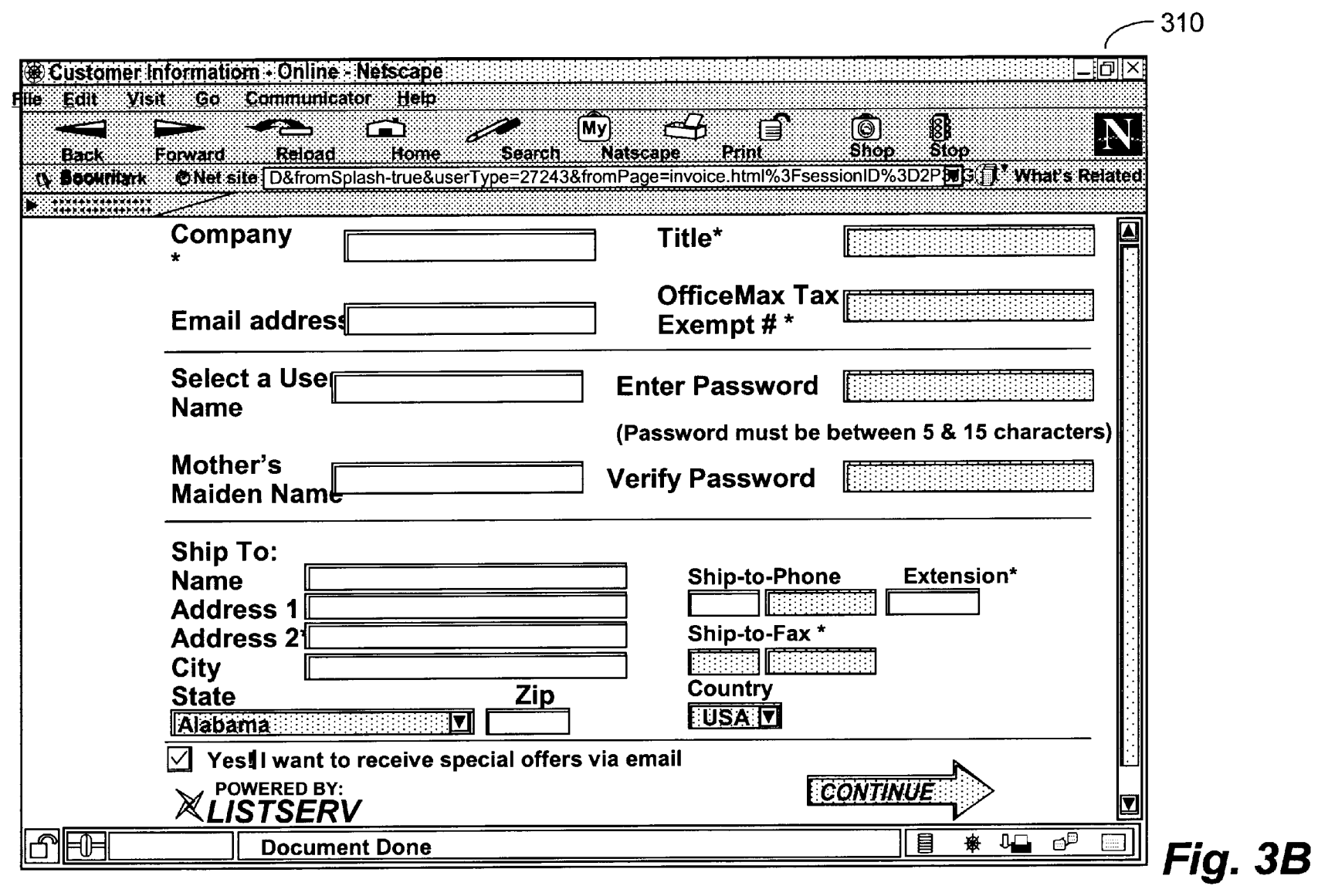

FIGS. 3A–3B show respectively one of the exemplary functions that online transaction module 204 performs. As shown in FIG. 3A, after a sequence of selection, a buyer finally determines to purchase a commercial file cabinet. A web page 300 is displayed on a screen of a computing device for the buyer and requires the buyer to enter a quantity to purchase. The computing device may be executing a browser such as a Netscape Communicator from www-.netscape.com or an Internet browser from www.microsoft-.com. To proceed with the purchase, web page 300 displayed by the browser demands that the buyer has to click "Checkout" 304 to proceed with the purchase. As soon as "Checkout" 304 is clicked, the browser generates a message including the quantity information and sends the message to online transaction module 204 that subsequently stores the quantity information, preferably, associated with a transaction identification or a user account designated to the buyer. If online transaction module 204 determines that additional information about the buyer is needed, a response to the message is then sent out from the server device and causes the browser to display a next web page 310 as shown in FIG. 3B. Web page 310 as displayed requires the buyer to provide the required additional information so that online transaction module 204 is ensured to fulfill the purchase order.

In the above example, online transaction module 204 captures typically text information entered by the buyer but could be deceived by a purchase dispute. For example, wrong quantity information was entered at 302 of FIG. 3A, and the purchase dispute could acclaim that online transaction module 204 has misinterpreted the message and subsequently causes the provider to be responsible for all costs associated with the wrong quantity information. The above example illustrates only one aspect of how online transaction module 204 could be subject to a possible fraud. There are many similar or more damaging incidents, collectively referred to as the cyber crime or fraud over the Internet. One of the key advantages and benefits in the present invention is to minimize such disputes or frauds by providing digital evidence related to the user's screen activities.

Figure 2B:
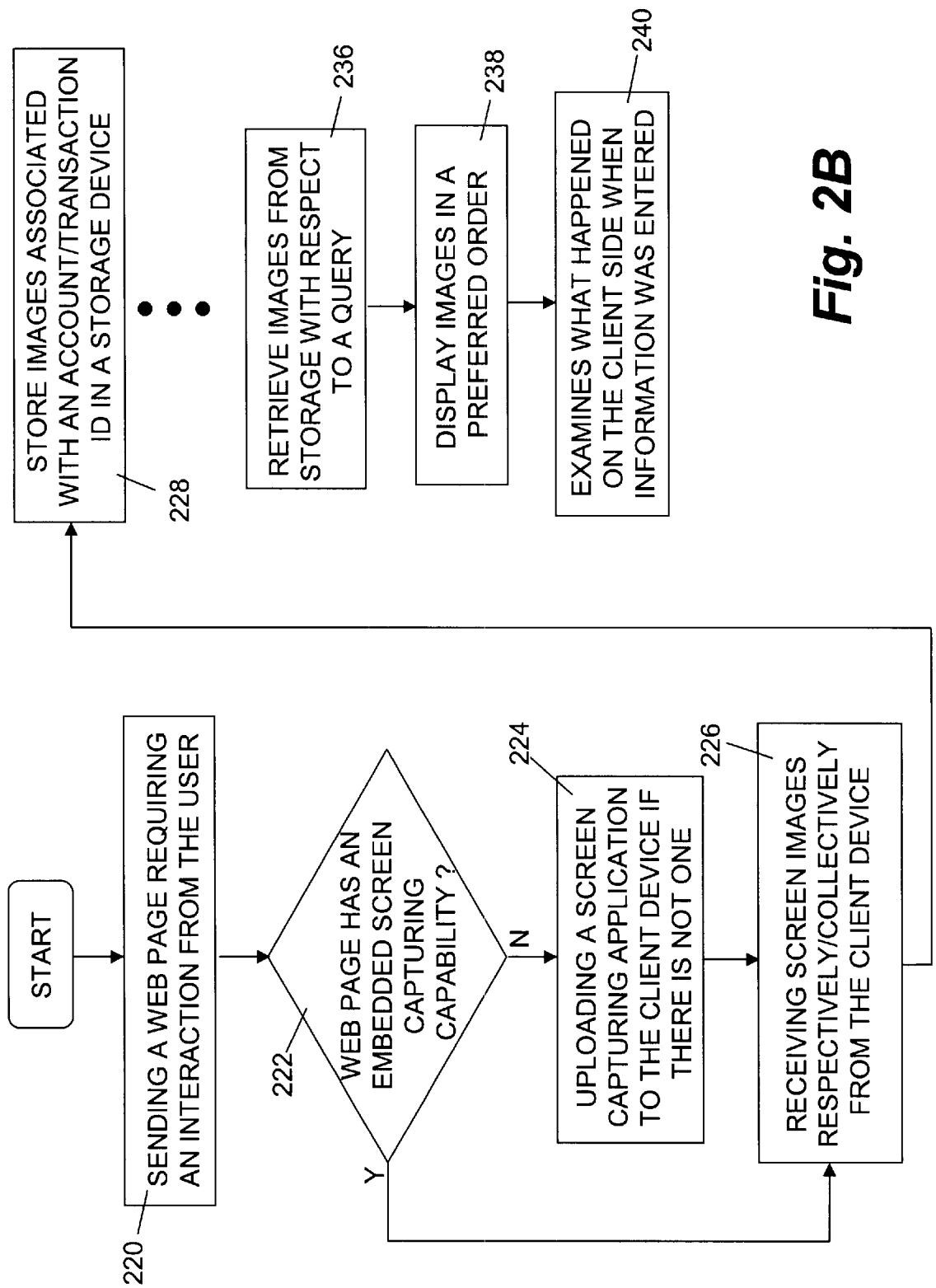
FIG. 2B shows a process flowchart of a digital evidence module used in the provider's server of FIG. 2A.

Referring back to FIG. 2A, digital evidence module 206 controls screen capturing process. FIG. 2B shows a process flowchart of digital evidence module 206 according to one embodiment of the present invention. When a client or computing device used by a buyer is caused to establish a data link with a provider's server and proceeds with a purchase order, online transaction module 204 retrieves an account for the buyer or establishes an account for the buyer if the buyer is new to the provider. The account may be updated with information received from the data link as to where and how the computing device has requested such link to be established thereto. The information may include an address identifier of the computing device. One exemplary address identifier is an Internet protocol (IP) address from which the computing device communicates with the server. The IP address may be assigned by an ISP when the computing device is logged onto the ISP for communication over the Internet.

The information may further include what browsing tool or application (e.g. a browser) the computing device is using to interact with the server. One of the browsing tools may be an Internet browser that generates requests to contact a server with its own identity therein. With the data link established between a client device and the server device and after the user browsed to an appropriate site or page (e.g. to engage in a transaction), at 220 a web page requiring user's interaction is sent to the computing device. The interaction may include a data entry, a click on a predefined area or metaphor or a click to cause a display of an electronic document as an acknowledgement.

At 222, it is to determine if the page just sent to the client has any embedded screen capture or capturing application (capability). The screen capturing application is preferably a computer program or an application, when executed, capable of recording one or more selected window screen displays or the entire display screen of the client device. One exemplary screen capturing product, called "FullShot", has similar concepts in the screen capturing application and is offered from Inbit, Inc. located at 1340 South De Anza Boulevard, Suite 202, in San Jose, Calif. 95129. FullShot permits a user to selectively capture an entire display or one or more displayed windows in the display screen.

If it is determined that the client device does not have any screen capturing application, a provider's preferred screen capturing application can be explicitly uploaded into the client device (i.e. the client device downloads the provider's preferred screen capturing application). The preferred screen capturing application may be a thin and modified version of FullShot and performs only screen capturing function. For example, web page 300 of FIG. 3A is a displayed window that can be captured by executing the preferred screen capturing application. Given the description of what the preferred screen capturing application intends to do, those skilled in the art will have no difficult to implement such screen capturing application.

In one preferred implementation, the screen capturing application is implemented as an applet that is embedded in a web page. When the web page is loaded in a client device and caused to be displayed thereon, the applet is activated to capture the web page with user's inputs as soon as the user clicks on a designated area or link (hence leading to "Y" of 222 of FIG. 2B).

As described above, a message is generated when the buyer clicks "CHECKOUT" 304 of FIG. 3A, the message includes what the buyer entered. One of the features in the present invention is to capture the displayed window (e.g. displayed web page 300) when the buyer clicks "CHECKOUT" 304. The preferred screen capturing application is executed when the buyer clicks "CHECKOUT" 304. In other words, an execution command is placed inherently with a clickable area, such as a hyperlink, an "hot" area or metaphor, a soft key or a designated sign. The captured displayed window is generally in a digital image format that can be cached in a local memory or sent out with the message. At 226, such images are successively received from the client device every time the buyer is asked to click a predefined area in the web page such as "submit", or "checkout", etc., or collectively received as a set of image data from the client device when the buyer finishes the transaction.

In some applications, each of captured images related to a transaction is preferred to be sent out individually, for example, together with data provided to a particular page. In other applications, each of captured images is initially cached in a local memory and the stored images are collectively sent out as soon as a transaction is complete.

Figure 2C:
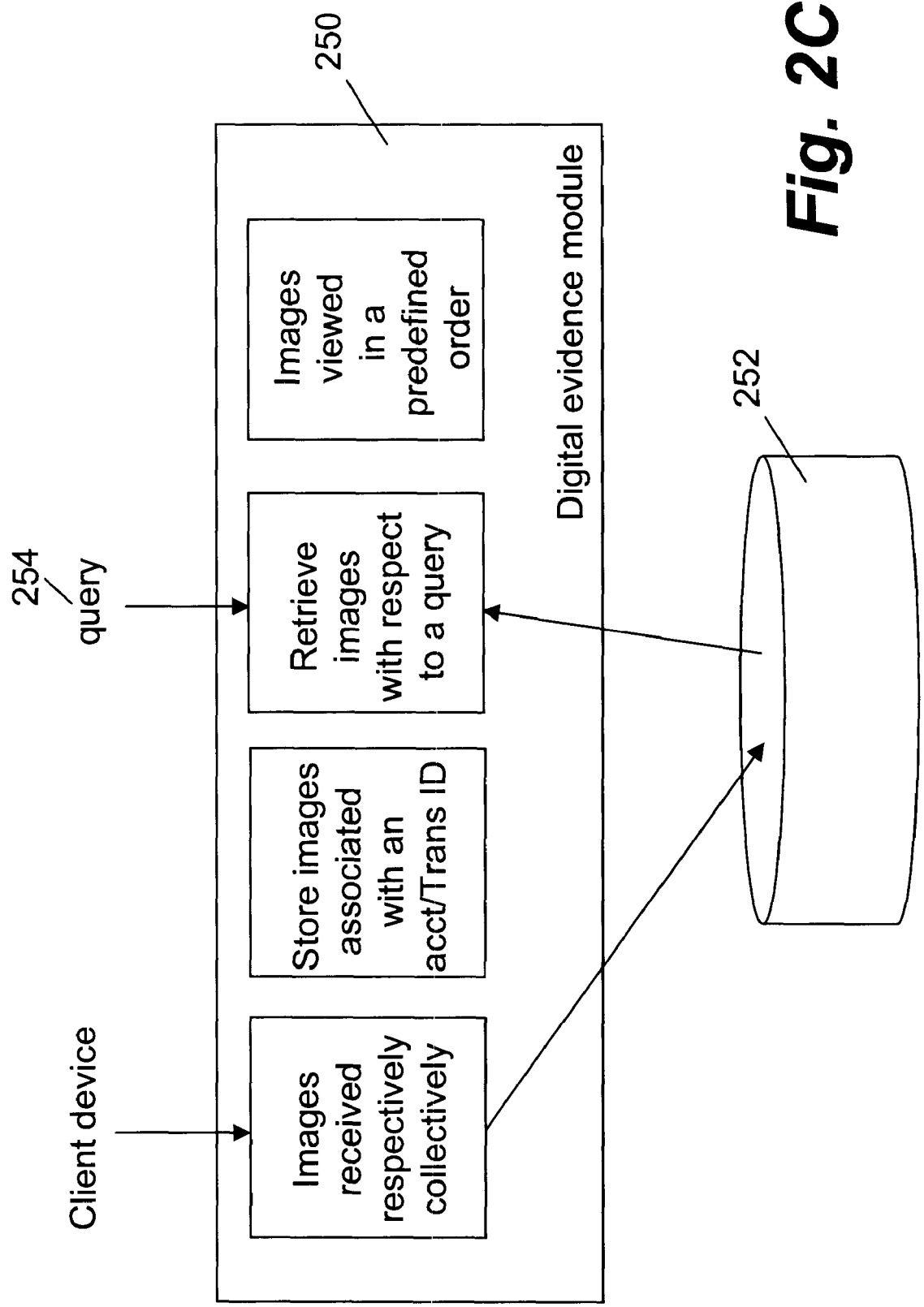
FIG. 2C shows a functional block diagram of a digital evidence module according to one embodiment used in an exemplary system.

Generally, the images received from a client device are kept as a digital evidence of the screen activities in a database or a storage device and preferably associated respectively with transaction identifications or user accounts for future references as illustrated in FIG. 2C in which digital evidence module 250 interfaces with a storage device or a database 252. In a case that a purchase dispute arises from a buyer, a set of screen images can be retrieved at 236 from the database or the storage device according to a query 254 related to a user account or a transaction ID involved in the purchase dispute. The set of images can be sequentially displayed at 238 in an order that the buyer proceeded, the provider can determine how or what screen activities engaged by the buyer at the time the related transactions occurred and makes a justified decision by examining the digital evidence at 240.

Figure 4A:
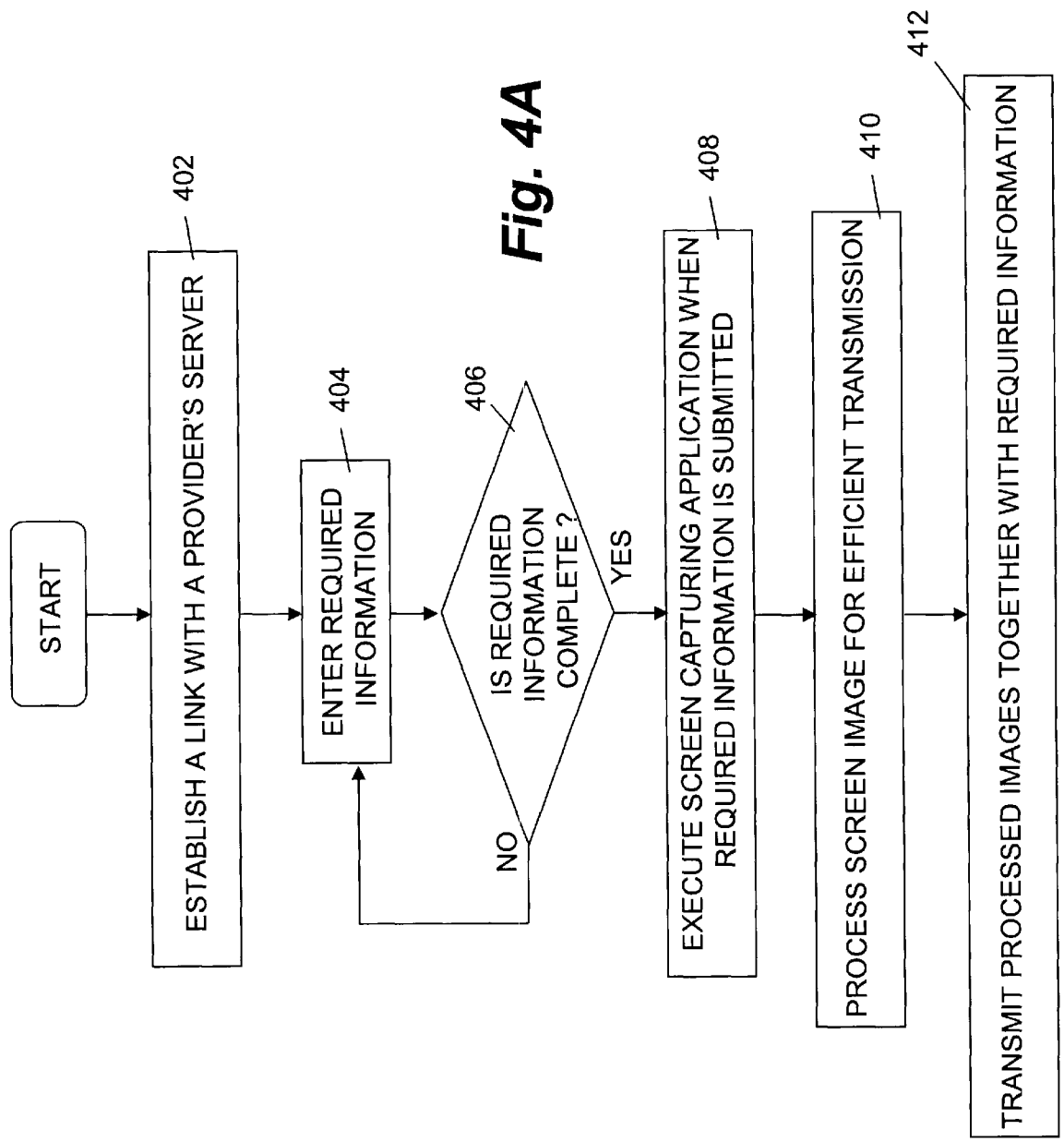
FIG. 4A shows a process flowchart of the present invention in the client device according to one embodiment.
Figure 4B:
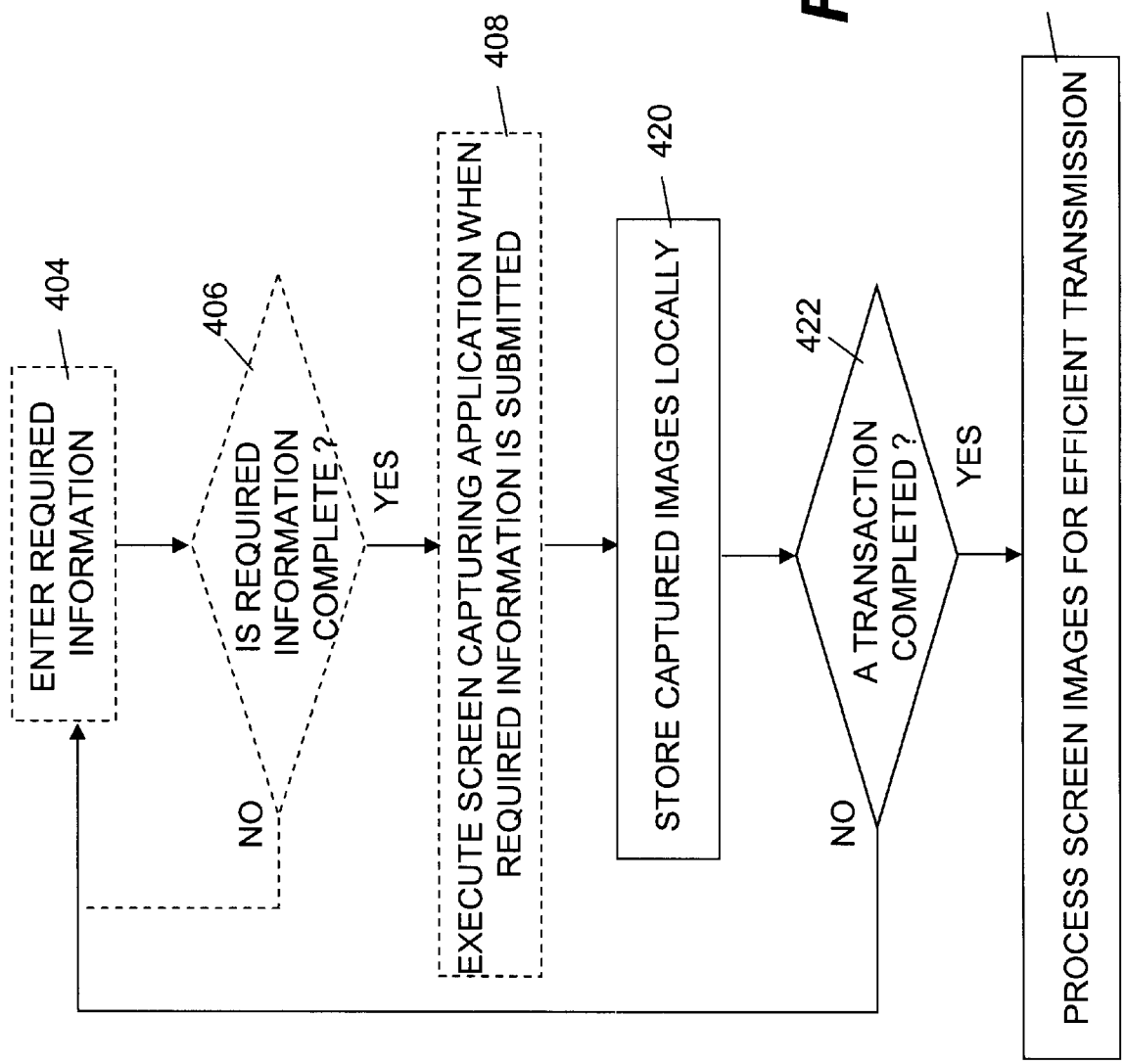
FIG. 4B shows a process flowchart of the present invention in the client device according to another embodiment.

Referring to FIGS. 4A–B, there are respectively shown a process flowchart of the client device according to one embodiment of the present invention. In accordance with the description above, FIGS. 4A–B shall be understood in conjunction with preceding figures. At 402 of FIG. 4A, the client device establishes a data link with the provider's server. The data link preferably includes a secure session when personal or financial information is transmitted over an open data network, such as the Internet. The two of the popular browsers, Netscape Communicator and Internet Explorer, all provide such mechanism to establish a secure session with the server when the server requires private data by sending a flag signal to activate the secure session. Typically a user is offered to select any items or services of interest or browse the entire site of the provider. When the buyer decides to enter a transaction for one or more items or services, the browser prompts to the buyer a screen for personalized information that may include number of shares of a particular stock to trade at a predefined price, entry of an electronic form and decisions on any electronic agreement (often seen from a brokerage web site), a particular product and a type of service. One example of such screens may be web page 310 of FIG. 3B in which a lot of personalized data must be entered. As soon as the user permits a submission of the data by clicking a "continue", the screen is instantly captured at 408 and the image thereof is associated with the data just entered by the user. At 410, the captured images are processed. One of the reasons for processing the images is to make the transmission of the images to the server more efficiently so that the user does not have to wait for too long before seeing a next screen. As it is well known to those skilled in the art that the screen images, especially those from HTML-based web pages, comprise large homogenous areas that are appropriate for some of the image compression techniques such as Run-Length-Encoding or LZW compression. The resultant compressed image may have a much smaller size than the original does, thus making the transmission of the captured screen images to the server at 412 fast enough so that the user would not feel prolonged latency resulting from the transmission of the screen images.

Referring now to FIG. 4B, there is shown a process flowchart modified from FIG. 4A. After screen capturing application is activated at 408 of FIG. 4A, the captured images are cached in a local memory at 420. The captured images may be a processed version of the original images depending on an implementation preference. At 420, it needs to determine if the current transaction is completed. This may be achieved by a message received from a server. If the transaction is incomplete, the user is required to continue with the transaction. When it is determined that the current transaction is complete at 422, all the captured images in the local memory are processed for transmission at 424.

One of the differences between processes in FIG. 4A and FIG. 4B is how the captured image is handled depending on application needs. In many purchase order transactions, FIG. 4B may be preferable as the captured images are not transmitted to the server till a buyer completes an order. In some applications, such as a proof of viewing a document, the captured image shall be released immediately to a server that seeks the proof.

The flowchart processes respectively in FIGS. 2A and 4A–4B along with the detailed description have made it evident to those skilled in art that the present invention can be implemented in numerous forms such as a system, a method or a computer readable medium. The present invention is preferably integrated with a browser or a browsing application so that no additional procedures are required from users. In one implementation, the present invention is implemented as a plug-in that can be downloaded into a client device. In another implementation, the present invention is implemented as an applet or an executable application that goes with some of the web pages requiring user's inputs. Alternatively, an implementation of the present invention may be downloaded from a pre-designated server when a client device communicates with a provider's server and is caused to do so.

Different implementations of the present invention yield one or more of the following advantages. One advantage of the invention is that an effective digital system is provided to online businesses to track screen activities conducted by users who engage in various transactions with the businesses so that the businesses can take necessary steps and make a justified decision when disputes or frauds arise. Another advantage of the invention is to activate the screen capturing process automatically when a user authorizes to release the user-provided data. The screen capturing process can be performed explicitly or implicitly depending on a particular implementation. Still another advantage of the present invention is the management of the screen images that need to be retrieved only when there is a need.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the present invention may be practiced independently from an online transaction module and can be used to capture displayed pages for collecting evidences or updating a digital evidence system. Accordingly, the scope of the present invention is defined by the appended claims rather than the foregoing description of embodiments.

We claim:

1. In a digital evidence system including a terminal device operable by a user to interact with a server device over a data network, wherein the terminal device includes a display screen, the server device comprising:

a memory for storing program code as a server module; and a processor coupled to the memory and executing the program code to cause the server module to perform operations of:

uploading a page over the data network for display on the display screen of the terminal device when the user decides to enter a transaction with the server device, wherein the page is embedded with a screen capturing module requires an entry from the user;

activating the embedded screen capturing module to capture a display of the page off the display screen to produce an image when the user clicks a button to release the entry to the server device, wherein the embedded screen capturing module is associated with the button and the image includes the entry and all other information in the page presented in pixel;

receiving the image from the terminal device; and associating the image with at least one identification identifying the transaction and an account identifying the user so that the image can be retrieved when there is a query related to the transaction.

2. The server device of claim 1, wherein the page includes elements based on a markup language.

3. The server device of claim 1, wherein the page includes a screen capturing application that can be automatically invoked to produce the image of the display of the page on the terminal display.

4. The server device of claim 1, wherein the image is a compressed representation of the display of the page.

5. The server device of claim 1, wherein the page is an electronic form requiring at least one of
(i) one or more selections from the user,
(ii) an electronic signature from the user,
(iii) quantity information, and
(iv) inputs from the user.

6. The server device of claim 5, wherein the entry includes at least one of the following:
(i) the one or more selections from the user,
(ii) the electronic signature from the user,
(iii) the quantity information, and
(iv) the inputs from the user.

7. In a digital evidence system including a terminal device operable by a user to interact with a server device over a data network, wherein the terminal device includes a display screen, the server device comprising:

an online transaction module;

an image database coupled to the online transaction module;

a memory for storing program code as a server module; and a processor coupled to the memory and executing the program code to cause the server module to perform operations of:

uploading a page over the data network for display on the display screen of the terminal device when the user decides to enter a transaction with the server device, wherein the page requires an entry from the user;

capturing a display of the page off the display screen to produce an image by activating an embedded screen capturing module when the user clicks a button to release the entry to the server device, wherein the embedded screen capturing module is associated with the button, and the image includes the entry and other information in the page presented in pixel;

receiving the image from the terminal device; and associating the image with at least one of an identification identifying the transaction and an account identifying the user so that the image can be retrieved when there is a query related to the transaction.

8. The server device of claim 7 wherein the online transaction module receives a request from the user over the data network when the transaction starts, the request including a piece of information indicating if the terminal device is equipped with a screen capturing application.

9. The server device of claim 8, wherein the online transaction module, in response to the request, sends a response that causes the terminal device to be loaded with the screen capturing application when the request shows that the terminal device is not equipped with such screen capturing application.

10. The server device of claim 7 wherein the page is based on a markup language.

11. The server device of claim 7 wherein the page comprises a screen capturing module that can be invoked to capture the image of the display on the terminal device when the user authorizes to release the entry entered in the display of the page.

12. The server device of claim 11 wherein the screen capturing module is an applet embedded in the page.

13. The server device of claim 7 wherein the page comprises a code that can invoke a screen capturing module resided in the terminal device.

14. A method for tracking screen activities engaged by a user for online transactions with a server device over a data network, the method comprising:

requiring an entry from the user to a display being displayed on a terminal device after the user decides to enter a transaction over the data network with a provider, wherein said requiring an entry comprises causing the client device to invoke an embedded screen capturing module associated with the display to take an image of the display when the user clicks a button to release the entry to the server device, wherein the screen capturing module is associated with the button, and wherein the image includes the entry and other information in the page presented in pixel;

receiving image data from the data network, the image data recording the display including the entry by the user; and storing the image data associated with the transaction in a memory space.

15. The method of claim 14; wherein said receiving image data comprises:

causing the image to be sent over the data network when the user decides to release the entry to the server device over the data network after the image is converted to the image data proper for transmission over the data network.

16. The method of claim 15; wherein the image data is a compressed version of the image so that the transmission of the image over the data network can be efficient.

17. The method of claim 14; wherein the display is one of
(i) an electronic form requiring one or more selections from the user,
(ii) an agreement requiring at least one electronic signature from the user,
(iii) an electronic form requiring at least quantity information, and
(iv) a displayed page requiring inputs from the user.

18. A method for tracking screen activities engaged by a user for online transactions with a server device over a data network, the method comprising:
requiring interactions from the user to one or more displays after the user decides to enter a transaction over the data network with a provider;
determining if the transaction is complete;
receiving image data from the data network if the transaction is complete, the image data recording the one or more displays including the interactions by the user; and
storing the image data associated with the transaction in a memory space.

19. The method of claim 18; wherein said requiring interactions from the user comprises:
causing the client device to capture an image of each of the one or more displays including the interactions by the user; and
causing the client device to store the image in a local memory thereof.

20. The method of claim 18; wherein each of the one or more displays is one of
(i) an electronic form requiring one or more selections from the user,
(ii) an agreement requiring at least one electronic signature from the user,
(iii) an electronic form requiring at least quantity information, and
(iv) a displayed page requiring inputs from the user.

21. A method for tracking screen activities engaged by a user for online transactions with a server device over a data network, the method comprising:
executing a browsing application to contact the server device over the data network by sending out a request;
displaying a page from the server device after the server device responds to the request;
the page requiring inputs from the user;
invoking a screen capturing application to capture an image of the page including the inputs as soon as the user authorizes to release the inputs to the server device; and
transmitting image data representing the image together with the inputs over the data network to the server device.

22. The method of claim 21, wherein the page is an electronic form that must be filled with the inputs from the user.

23. The method of claim 21, wherein said transmitting image data comprises converting locally the image to the image data.

24. The method of claim 23, wherein the image data is a compressed version of the image.

25. A method for tracking screen activities engaged by a user for online transactions with a server device over a data network, the method comprising:
receiving respectively a sequence of web pages from a server device after the server device is contacted for conducting a transaction over the data network;
displaying individually the web pages for inputs from the user;
accepting the inputs by showing where the inputs are entered in the web pages;
activating a screen capturing application to capture an image of each of the web pages including the inputs every time the user authorizes to release the inputs to one of the web pages to the server device;
storing images of the web pages including the inputs in a local memory space; and
releasing the images to the server device after the transaction is complete.

26. The method of claim 25 further comprising compressing the images locally according to a predefined compression standard so that said releasing the images to the server device is performed more efficiently over the data network.

27. The method of claim 25 wherein the screen capturing application is embedded as an executable application in each of the web pages.

28. A computer program product for tracking screen activities engaged by a user for online transactions with a server device over a data network, the computer program product comprising:
program code for requiring an entry from the user to a display being displayed on a terminal device after the user decides to enter a transaction over the data network with a provider, wherein the program code for requiring an entry comprises program code for causing the client device to invoke an embedded screen capturing module to take an image of the display when the user clicks a button to release the entry to the server device, and
wherein the image includes the entry and other information in the page presented in pixel;
program code for receiving image data from the data network, the image data recording the display including the entry by the user; and
program code for storing the image data associated with the transaction in a memory space.

29. The computer program product of claim 28; wherein the program code for receiving image data comprises:
program code for causing the image to be sent over the data network when the user decides to release the entry to the server device over the data network after the image is converted to the image data proper for transmission over the data network.

30. The computer program product of claim 28; wherein the image data is a compressed version of the image so that the transmission of the image over the data network can be efficient.

31. The computer program product of claim 28; wherein the display is an electronic document that requires at least one of
(i) one or more selections from the user,
(ii) an electronic signature from the user,
(iii) quantity information, and
(iv) inputs from the user.

32. The computer program product of claim 28, wherein the computer program product can be obtained in one of the following ways: downloadable from the data network and in a computer readable medium.

33. A computer program product for tracking screen activities engaged by a user for online transactions with a server device over a data network, the computer program product comprising:

program code for requiring interactions from the user to one or more displays after the user decides to enter a transaction over the data network with a provider;

program code for determining if the transaction is complete;

program code for receiving image data from the data network if the transaction is complete, the image data recording the one or more displays including the interactions by the user; and program code for storing the image data associated with the transaction in a memory space.

34. The computer program product of claim 33; wherein the program code for requiring interactions from the user comprises:

program code for causing the client device to capture an image of each of the one or more displays including the interactions by the user; and program code for causing the client device to store the image in a local memory thereof.

35. The computer program product of claim 33; wherein each of the one or more displays is an electronic document that requires at least one of (i) one or more selections from the user, (ii) an electronic signature from the user, (iii) quantity information, and (iv) inputs from the user.

36. A computer program product for tracking screen activities engaged by a user for online transactions with a server device over a data network, the computer program product comprising:

program code for executing a browsing application to contact the server device over the data network by sending out a request;

program code for displaying a page from the server device after the server device responds to the request;

the page requiring inputs from the user;

program code for invoking a screen capturing application to capture an image of the page including the inputs as soon as the user authorizes to release the inputs to the server device; and program code for transmitting image data representing the image together with the inputs over the data network to the server device.

37. The computer program product of claim 36, wherein the page is an electronic form that must be filled with the inputs from the user.

38. The computer program product of claim 36, wherein said transmitting image data comprises converting locally the image to the image data.

39. The computer program product of claim 38, wherein the image data is a compressed version of the image.

40. A computer program product for tracking screen activities engaged by a user for online transactions with a server device over a data network, the computer program code comprising:

program code for receiving respectively a sequence of web pages from a server device after the server device is contacted for conducting a transaction over the data network;

program code for displaying individually the web pages for inputs from the user;

program code for accepting the inputs by showing where the inputs are entered in the web pages;

program code for activating a screen capturing application to capture an image of each of the web pages including the inputs every time the user authorizes to release the inputs to one of the web pages to the server device;

program code for storing images of the web pages including the inputs in a local memory space; and program code for releasing the images to the server device after the transaction is complete.

41. The computer program product of claim 40 further comprising program code for compressing the images locally according to a predefined compression standard so that the program code for releasing the images to the server device can be executed more efficiently over the data network.

42. The computer program product of claim 40 wherein the screen capturing application is embedded as an executable application in each of the web pages.

* * * * *